United States Patent [19]

Dunaenko, Jr. et al.

[11] Patent Number: 5,333,521

[45] Date of Patent: Aug. 2, 1994

[54] WIRE STRIPPER

[75] Inventors: Charles Dunaenko, Jr., Somerset, N.J.; Ivan Pawlenko, Holland; Larry P. Samson, Langhorne, both of Pa.

[73] Assignee: AT&T Bell Laboratories, Murray Hill, N.J.

[21] Appl. No.: 111,344

[22] Filed: Aug. 24, 1993

[51] Int. Cl.$^5$ ............................................. H02G 1/12
[52] U.S. Cl. ................................................ 81/9.51
[58] Field of Search .......................... 81/9.51, 9.4

[56] References Cited

U.S. PATENT DOCUMENTS

| | | | |
|---|---|---|---|
| 2,880,635 | 4/1959 | Harris | 81/9.51 |
| 3,892,145 | 7/1975 | Richie | 81/9.51 |
| 3,951,016 | 4/1976 | Gudmestad et al. | 81/9.51 |
| 4,345,362 | 8/1982 | de Givry | 29/426.5 |
| 5,140,873 | 8/1992 | Schwartzman | 81/9.51 |

OTHER PUBLICATIONS

Stripmaster Corp., Sales Literature, date unknown, Wire Strippers, pp. 17–18.
*Electronic Design News*, May 13, 1993, p. 74, Sales Advertisement, Trompeter Electronics, Inc., Hand-Held Stripping Tool.

Primary Examiner—Roscoe V. Parker
Attorney, Agent, or Firm—Robert B. Levy

[57] ABSTRACT

A wire stripper (10) for stripping an outer insulative jacket from a cable (12) includes a frame (14) which carries a cable clamp (16) for releasably clamping the cable. The frame also carries a slitting mechanism (43) which includes a rotatable blade carrier (46) and a central passage (48) through which the cable passes. The blade carrier includes a pair of blades (60—60) each radially movable within a separate one of a pair of diametrically opposed slots (56—56) so as to circumferentially slit the insulative jacket when the blade carrier is rotated in a first direction. A gripping mechanism (94) is slidably mounted to a pair of rails (100—100) carried by the frame for gripping a portion of the cable downstream of the blade carrier so as to pull the severed portion of the outer insulative jacket from the cable when the gripping mechanism is displaced by a lever (108).

8 Claims, 3 Drawing Sheets

WIRE STRIPPER

TECHNICAL FIELD

This invention relates to a device for stripping cable.

BACKGROUND OF THE INVENTION

Notwithstanding the proliferation of other types of communications media, such as optical fiber, metallic cable is still widely used by telecommunications carriers for transmitting data and voice information. Much of the metallic cable in use comprises multiple pairs of individual metallic conductors (i.e., copper), each sheathed by an insulative jacket, typically made of plastic or the like. The individual conductors are collectively sheathed by an outer insulative jacket, also made from plastic or the like. Depending on the environment in which the cable is to operate, an armor layer may be provided about the outer insulative jacket.

In order to terminate each end of such a multiconductor, a portion of the outer insulative jacket (and the armor layer, if present) must be stripped away so that the individual conductors are exposed. In the past, removal of the insulative outer jacket and the armor layer was accomplished by first slitting both the outer jacket and armor layer to enable them to be severed proximate the end of the cable to be terminated. Thereafter, the severed portion of the outer jacket and armor layer were removed, typically by manually grasping and then pulling them off the cable.

The disadvantage of this approach is that unless extreme care is taken, an operator can easily slit not only the outer jacket and armor layer but the insulative jacket sheathing one or more of the individual conductors. Moreover, the task of pulling off the outer insulative jacket and armor layer is often difficult to accomplish by hand, especially when the cable contains a large number of conductor pairs. To pull off a long length of the outer insulative jacket and armor layer of a cable containing a large number of individual conductors, the outer insulative jacket and the armor layer must be slit at regular intervals, thus increasing the risk that the insulation on one of the individual conductors may be inadvertently slit as well.

In an effort to overcome the difficulties associated with manually stripping a cable, different types of wire stripping devices have been developed. Examples of such devices are disclosed in U.S. Pat. Nos. 2,880,635, 3,892,145, 3,951,016 and 4,345,361. For the most part, the wire strippers of the prior art have been large, mechanically complex devices, best suited for use in a factory environment. Yet there is often a great need to strip a multiconductor cable in the field during installation of a piece of electronic equipment.

Thus there is a need for a wire-stripping apparatus that can be readily used in the field for stripping the outer insulative jacket (and the armor layer, if present) from a multiconductor cable.

SUMMARY OF THE INVENTION

Briefly, in accordance with the invention, there is provided an apparatus for stripping the outer insulative jacket (and an armor-layer, if present) from a cable The apparatus includes a frame that carries a pivotally-operated cable clamp for releasably engaging a portion of the cable a distance from a free end thereof. The frame also carries a slitting mechanism, including a blade carrier having a central opening through which the free end of the cable passes so as to extend therebeyond. The blade carrier also has a pair of diametrically opposed slots on opposite sides of the central opening, each slot receiving a separate one of a pair of blades movable within the slot. A lever-actuated device is provided for rotating the blade carrier in opposite directions and for forcing the blades radially inward towards the blade carrier central opening when the blade carrier is rotated in a first direction. When the blade carrier is rotated in the first direction, and the blades are urged radially inward, the blades circumferentially slit and sever the outer insulative jacket (and the armor layer) of the cable.

The wire stripper also includes a pulling and gripping mechanism for simultaneously gripping the cable and pulling the severed portion of the outer insulative jacket (and armor layer) off of the cable. The pulling and gripping mechanism includes at least one rail carried by the frame so as to extend generally parallel that portion of the cable received through, and extending beyond, the slitting mechanism. A traveler, carrying a pair of pivotally-mounted, cam-shaped cable-engaging jaws, is slidably mounted to the rail for movement in a direction parallel to the length of the cable extending beyond the slitting mechanism. A lever is pivotally connected to both the traveler and to the frame for reciprocating the traveler along the rail. When the free end of the cable is gripped by the jaws on the traveler, and the traveler is displaced along the rail away from the slitting mechanism by actuation of the lever, the severed portion of the outer insulative jacket (and the armor layer, if present) gripped by the jaws on the traveler is stripped from the cable.

DETAILED DESCRIPTION

Figure 1:
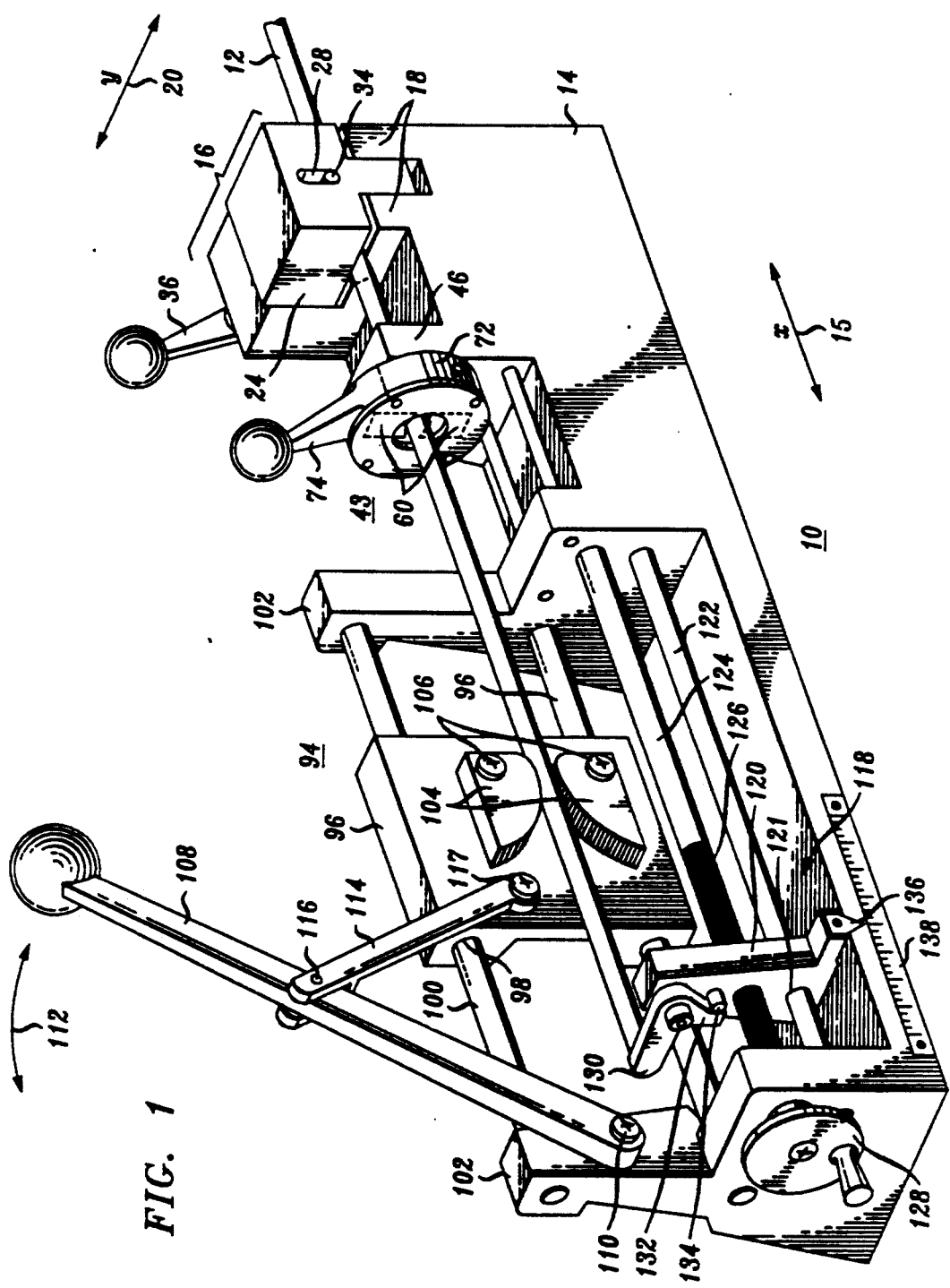
FIG. 1 is a perspective view of a preferred embodiment of a wire stripper in accordance with the invention.
Figure 2:
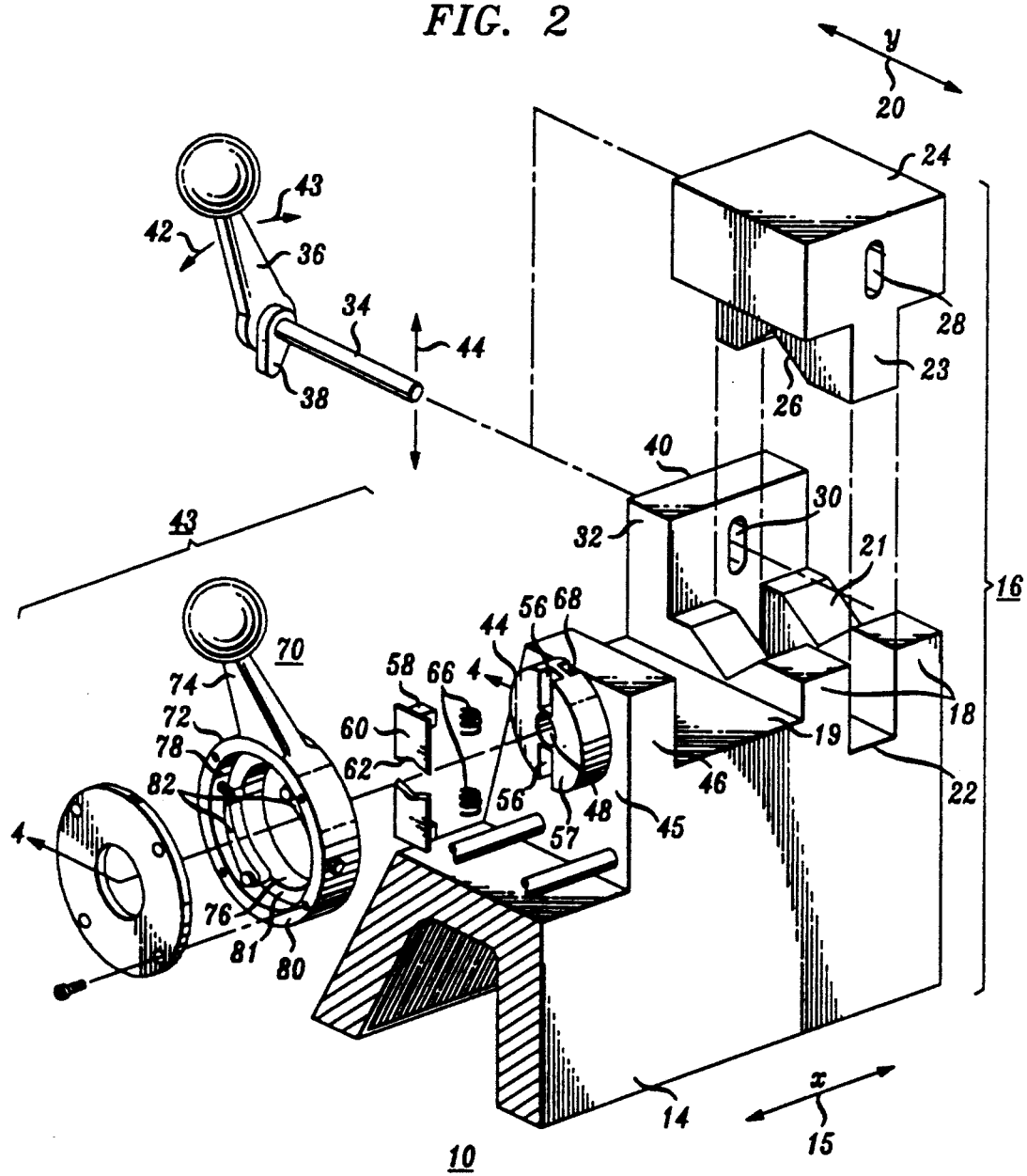
FIG. 2 is a perspective view of a portion of the wire stripper of FIG. 1 showing the details of a wire stripper cable clamp and a blade actuation mechanism, each comprising part of the wire stripper.

FIG. 1 shows a wire stripper 10, in accordance with the invention, for stripping an outer insulative jacket (as well as an overlying armor layer, if present) from a multiconductor cable 12. The wire stripper 10 comprises a frame 14, typically in the form of a rigid beam that extends generally parallel to a first (x) axis 15. The frame carries part of a cable clamp 16 for releasably clamping the cable 12. Referring to FIGS. 1 and 2, the cable clamp 16 includes a pair of spaced-apart shoulders 18 that rise upwardly above a horizontal surface 19, forming the top of the frame 14. As best seen in FIG. 2, each shoulder 18 is situated near the rearward (right-hand) end of the frame so as to run generally along a second (y) axis 20, perpendicular to, but lying in the same plane as, the x axis 15. A "V"-shaped notch 21 is formed in the top of each shoulder 18 to accommodate the cable 12.

Situated between the shoulders 18—18 is a valley 22 that extends vertically into the frame 14 below the level of the top surface 19. The width of the valley 22 is just slightly greater than the width of a lip 23 depending from a slab 24. The lip 23 has a "V"-shaped notch 26 sloped opposite to the notch 21 in each of the shoulders 18—18. When the slab 24 is placed on and urged against the shoulders 18—18 such that lip 23 is received in the valley 22, then the cable 12 of FIG. 1 is held firmly between the notch 26 and the notches 21—21.

The slab 24 of FIGS. 1 and 2 has a vertically oriented, race track-shaped through-passage 28 parallel to the axis 20. When the slab 24 is placed on the shoulders 18—18 such that the lip 23 is received in the valley 22, the passage 28 through the slab communicates with a vertically-oriented, race track-shaped passage 30 extending through a prismatic projection 32 rising upwardly from the top surface 19 of the frame 14 so as run in a direction parallel to the x axis 15.

Extending through the passages 28 and 30 is a shaft 34 that has a lever 36 integrated to its end distant from the projection 32 (i.e., the left-hand shaft end as seen in FIG. 2). The shaft 34 carries a cammed member 38 that lies just to the right of the lever 36. When the shaft 34 is received in the passages 28 and 30, the cammed member 38 is received in a cammed opening (not shown) in a first face 40 of the projection 32.

The cammed opening in the face 40 of the projection 32 is shaped such that when the cammed member 38 is received in the opening and the lever 36 is rotated through a first arc 42, the shaft 34 moves vertically downward, parallel to a third (z) axis 44. As a consequence, the shaft 34 urges the slab 24 downward and against the shoulders 18—18, causing the cable 12 of FIG. 1 to be gripped between the notches 21—21 and the notch 26. When the lever 36 is rotated through a second arc 43, then the shaft 34 is urged upward to release the cable 12 of FIG. 1.

In addition to carrying a portion of the cable clamp 16, the frame 14 also carries a slitting mechanism 43 for slitting the outer jacket (and armor layer, if present) of the cable 12. As best seen in FIG. 2, the slitting mechanism 43 includes a blade carrier 44 that typically takes the form of a hub rotatably journalled, by suitable bearing means (not shown), into a forward face 45 (i.e., a left-hand face as seen in FIG. 2) of a wall 46 that rises upwardly from the top surface 19 of the frame 14 parallel to the axis 20. The blade carrier 44 has a central through-passage 48 in communication with a passage (not shown) extending through the wall 46 parallel with the axis 15 and in aligned registration with the troughs formed by each notch 21 in a separate one of the shoulders 18. In this way, the cable 12 of FIG. 1, when clamped by the clamp 16 a distance from its free end, can have that free end pass through the wall 46 and through the opening 48 in the blade carrier 44 to extend therebeyond.

The blade carrier 44 has a pair of diametrically-opposed, radial slots 56—56 in its forward (i.e., left-hand) face. Each blade carrier slot 56 is sized to receive a tab 58 projecting horizontally rearward (i.e., rightward in FIG. 2), from a first end of a blade 60. Each blade 60 has a sharp tip 62 at its end furthest from tab 58. The blades 60—60 are mounted to the blade carrier 44 with their respective tab 58 seated in a separate one of the slots 56—56 such that the tip 62 of each blade is proximate the blade carrier central opening 48.

Figure 4:
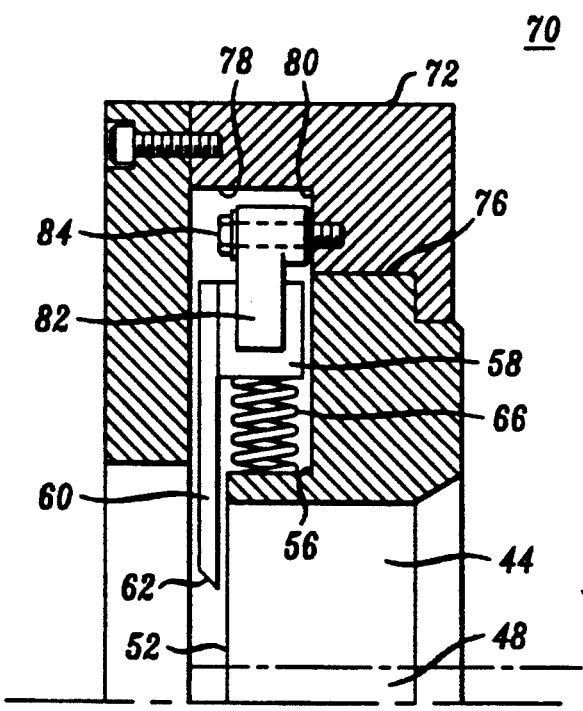
FIG. 4 is a cross-sectional view, taken along the plane 4—4 of FIG. 2, showing additional details of the blade carrier actuation mechanism.

Referring to FIG. 4, which shows a cross-sectional view of the blade carrier 44, a compression spring 66 is seated in each slot 56 between the bottom of the slot and the tab 58 on the back of the blade 60. Each spring 66 biases its corresponding blade 60 radially outward and away from the blade carrier central opening 48. In this way, the blade tip 62 is maintained out of contact with the cable 12 (see FIG. 1) received through the blade carrier central opening 48. Only when the tab 58 on each blade 60 of FIG. 2 is biased against its corresponding spring 66 does the blade tip 62 of the come into contact with the cable 12 of FIG. 1.

As thus far described, the blade carrier 44 carries a pair of blades 60—60 that are operative to slit and sever the insulative outer jacket of the cable 12. However, in the case where the cable 12 has an armor layer circumscribing the insulative layer, it is useful to provide a second set of blades (not shown), located rearward of the blades 60—60, for severing the armor layer while the blades 60—60 sever the insulative jacket. In order to carry a second set of blades, the blade carrier 44 is provided with a second pair of slots 68 (only one shown) each located on the blade carrier face opposite the face 52. Each second blade carrier slot 68 lies in aligned registration with a separate one of the blade carrier slots 56—56 for receiving a tab on a blade configured the same as each blade 60.

Referring to FIGS. 2 and 4, the slitting mechanism 43 includes a device 70 for rotating the blade carrier 44 while simultaneously urging each of the blades 60—60 (as well as the blades associated with the slots 68—68) radially inward as the blade carrier rotates in a first direction. In this way, the blades will circumferentially slit, and thus sever, the insulative outer jacket, as well and the armor layer (if present) of the cable 12. The device 70 comprises an annulus 72 having a lever 74 extending from the annulus so as to be generally tangential thereto. The annulus 72 has a through-passage 76 slightly larger than the diameter of the blade carrier 44 to permit the annulus to be received about, and rotate around, the blade carrier.

Figure 3:
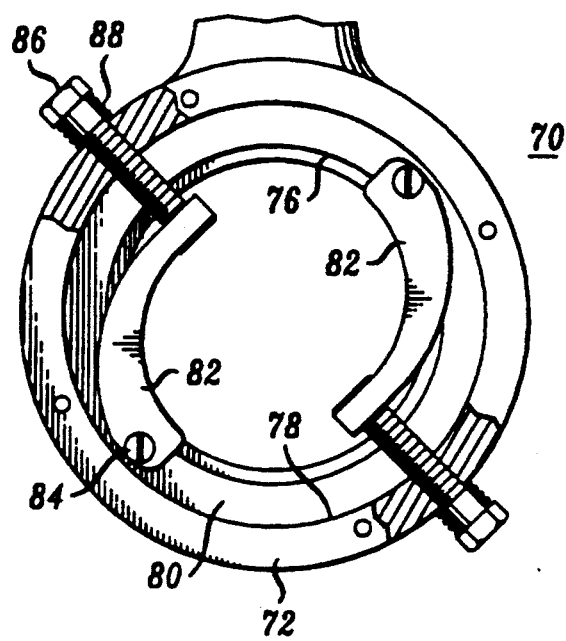
FIG. 3 is a front view of a portion of the blade carrier actuation mechanism of FIG. 2.

A counter-bore 78 is provided in a forward (leftward) face 80 of the annulus 72. The counter-bore 78 is a diameter greater than the through-passage 76, creating a ring-shaped seat 81 within the annulus. Situated within the counter-bore 78 is a pair of arcuate fingers 82—82. As best illustrated in FIG. 3, each of the fingers 82—82 has a first one of its ends mounted to the seat 81 by a fastener 84 (typically a screw or the like) to enable each finger to pivot to and from the other such that the free end of each finger 82 is diametrically opposed to the free end on the other. The degree to which each finger 82 can pivot away from the other is controlled by a separate one of a pair of bolts 86—86, each threaded into the annulus 72 in a radial direction to bear against the free end of the finger. A spring 88 is interposed between the head of each bolt 86 and the outer periphery of the annulus 72 to prevent the bolt from loosening. Once the fingers 82—82 are mounted within the annulus 72, a cover plate 90, best shown in FIG. 2, is secured to the face 80 of the annulus by way of a set of screws 92 (only one shown) to overlie the counter-bore 78.

Referring to FIG. 4, the annulus 72 is positioned to circumscribe the blade carrier 44 so that the free end of each of the fingers 82—82 contacts the periphery of the blade carrier. As the annulus 72 is rotated in a first direction (clockwise in FIG. 2), the free end of each finger 82 rides on the periphery of the blade carrier 44 until the finger reaches one of the lots 56—56, whereupon the finger enters the slot. Continued rotation of the annulus 72 after the free end of each of the fingers 82—82 seats in a separate one of the slots 56—56 causes each finger to bear against the tab 58 on an associated one of the blades 60—60. As a result, each blade 60 is urged radially inward so as to make a circumferential slit in the outer insulative jacket in the cable 12 as the annulus 72 is rotated. When the annulus 72 is rotated in the opposite direction, the free end of each finger 82 no longer bears against the tab 58 of each blade 60. Thus, each blade 60 is now urged by its associated spring 66 away from the blade carrier central opening 48. In the event that the blade carrier carries a second pair of blades (not shown) each having a tab seated in a separate one of the slots 68, then each of a second pair of fingers (not shown) would be provided for urging such blades radially inward in the same manner as described for the blades 60—60.

Referring to FIG. 1, the wire stripper 10 includes a lever-operated mechanism, designated generally by the reference numeral 94. As will be described, the mechanism 94 operates to simultaneously grip and pull off that portion of the outer insulative jacket (and the armor layer, if present) of the cable 12 previously severed by the blades 60—60. The mechanism 94 includes a traveler 96, having a pair of horizontal through-passages 98—98, each parallel to the x axis 15.

Each passage 98 in the traveler 96 receives a separate one of a pair of polished rails 100—100, each rail secured at each of its ends to a separate one of a pair of columns 102—102 rising upwardly from the frame 14 in vertical, spaced-apart parallelism. The rails 100—100 are parallel to each other so as to be generally parallel to that length of the cable 12 extending beyond the slitting mechanism 43. In this way, the traveler 96 can be reciprocated along the rails 100—100 generally parallel to the axis of the cable 12.

As seen in FIG. 1, the traveler 96 mounts a pair of vertically spaced, cam-shaped jaws 104—104, each secured to the traveler by way of a separate one of a pair of screws 106—106 so that each jaw can pivot to and from the other. The shape and configuration of the jaws 104—104 and their location on the traveler 96 are such that when the cable 12 is placed between the jaws 104—104, the jaws pivot towards each other as the traveler is displaced in a first direction (leftward as seen in FIG. 2). In this way, the cable 12 is firmly gripped by the jaws 104—104. Conversely, when the traveler 96 is displaced in a second (rightward) direction, the jaws 104—104 pivot apart, releasing the cable 12.

The traveler 96 is reciprocated along the rails 100—100 by way of a lever 108 secured at a first end by a screw 110 to the left-hand one of the columns 102—102 so as to enable the lever to pivot through an arc 112. The lever 108 is pivotally connected near its midpoint to one end of a link 114 via a pin 116. The link 114 has its opposite end pivotally connected to the traveler 96 via a screw 118. The coupling of the lever 108 and the link 114 between the traveler 96 and the left-hand column 102 of the frame 14, respectively, is such that when the lever is pivoted through an arc 112, the traveler 96 is reciprocated horizontally along the rails 100—100.

The wire stripper 10 advantageously includes an adjustable cut-off guide 118 for establishing the length of the outer insulative jacket (as well as the armor layer, if present) to be stripped from the cable 12. The cut-off guide 118 includes a traveler 120 having a horizontally extending, through-passage 121 that receives a rail 122 secured at each of its ends to a separate one of the columns 102—102 so as to be parallel to the rails 100—100.

The cut-off guide 118 also includes a shaft 124 having a partially threaded portion 126 in threaded engagement with a threaded passage through the traveler 120. The shaft 124 has each of its ends rotatably journalled into a separate one of the frame columns 120—120 so as to be rotatable about an axis parallel to the x axis 15. A portion of the shaft 124 extends out beyond the left-most frame column 102, as seen in FIG. 1, for receipt through, and engagement with, a crank 128. By cranking the crank 128, the shaft 124 is thus rotated so that the threaded shaft portion 126 threads through the traveler 120, causing the traveler to be displaced along the rail 122.

The traveler 120 has a finger 130 pivotally mounted near its upper end for rotation about an axis parallel to the axis 15. The finger 130 is of a sufficient length so that when rotated in a first (counterclockwise) direction such that a dog 132 on the finger engages a stop 134 on the traveler, the finger extends horizontally outward in a direction parallel to the y axis 20 and into the path of the free end of the cable 12 extending beyond the slitting mechanism 43. In this way, the length of the cable 12 extending beyond the slitting mechanism 43 is bounded by the finger 130 on the cut-off guide 118. By rotating the finger 130 in a clockwise direction, then the finger is displaced away from the path of the cable 12.

As may now be appreciated, the traveler 120 is displaced axially along the rail 122 to and from the slitting mechanism 43 when the crank 128 is rotated to establish the lineal distance of the finger 130 from the slitting mechanism. In this way, the length of the insulative outer jacket (and armor layer, if present) to be stripped from the cable 12 can be established. To set the exact length of outer insulative jacket (and armor layer, if present) to be stripped, the traveler 120 is provided with an indicating pointer 134 that rides along a scale 134 on the frame 14. The scale 134 is calibrated to indicate the distance of the traveler 120, and hence the finger 130, from the slitting mechanism 43.

The overall operation of the wire stripper 10 will now be briefly described. To effect removal of a length of the outer insulative jacket (and armor layer, if present) of the cable 12, the cut-off mechanism 118 is first adjusted by cranking the crank 128 until the pointer 132 indicates the appropriate distance of the finger 130 from the slitting mechanism 43. Thereafter, the lever 108 is pivoted rightward to displace the traveler 96 to its rightward-most position. Next, the cable clamp 16 is opened, by pivoting the lever 36. The cable is then fed through the cable clamp 16 and through the slitting mechanism 43. From the slitting mechanism 43, the cable 12 is fed between the jaws 104—104 so as to reach the finger 130 of the cut-off guide 118, the finger having been rotated previously to its horizontal orientation.

Once the cable 12 has been fed through the wire stripper 10 in this manner, the lever 36 associated with the cable clamp 16 is rotated to urge the slab 24 downward against the shoulders 18—18 so that the cable is now clamped. Next, the lever 74 associated with the slitting mechanism 43 is rotated in a clockwise direction to urge the blades 60—60 radially inward to circumferentially slit the outer insulative jacket of the cable 12. Finally, the finger 130 is manually rotated out of the path of the cable 12, and then the lever 112 is pivoted to displace the traveler 96 leftward along the rails 100—100 away from the slitting mechanism 43. As the traveler 96 is displaced in this direction, the severed portion of outer insulative jacket (and armor layer, if present) of the cable 12 is thus stripped off.

The foregoing discloses a wire stripper 10 for stripping the outer insulative jacket (and overlying armor layer, if present, from a cable 12.

It is to be understood that the above-described embodiments are merely illustrative of the principles of the invention. Various modifications and changes may be made thereto by those skilled in the art which will embody the principles of the invention and fall within the spirit and scope thereof.

We claim:

1. Apparatus for stripping a cable having an outer insulative jacket, comprising:

a frame;

a cable clamp carried, in part, by the frame for releasably engaging the cable;

slitting means carried by the frame for circumferentially slitting the outer jacket of the cable, the slitting means including:

a blade carrier rotatably journalled to the frame a distance from the cable clamp, the blade carrier having a first face through which a central opening extends so as to allow the cable to pass through, and extend beyond, the blade carrier, and the first face of the blade carrier having a pair of diametrically opposed slots, each slot extending radially from the blade carrier central opening;

at least one pair of blades, each blade slidably mounted in a separate one of the blade carrier slots for movement to and from the blade carrier central opening; and means for rotating the blade carrier in a first and second direction and for urging the blades radially inwardly towards each other as the blade carrier is rotated in the first direction so that the blades extend at least partially into the blade carrier opening to cut into the outer insulative jacket of that portion of the cable received through the blade carrier central opening;

at least one first rail carried by the frame so as to extend generally parallel to that portion of the cable extending beyond the blade carrier;

means slidably mounted to the rail for releasably gripping the insulation layer on that portion of the cable received through, and extending beyond, the blade carrier; and lever means pivotally connected to both the frame and the gripping means for displacing the gripping means along the first rail to cause the gripping means to pull the outer insulative jacket, severed by the blades, off the cable.

2. The apparatus according to claim 1 wherein the means for rotating the blade carrier comprises:

an annulus surrounding the blade carrier;

a lever integral with the annulus for rotating the annulus about the blade carrier;

a pair of arcuate fingers, each pivotally coupled within the annulus at a point diametrically opposed to the other finger for urging a separate one of the blades in the blade carrier radially inward when the annulus is rotated in a first direction; and a pair of springs, each seated in a separate one of the blade carrier slots, for urging a separate one of the blades radially outward.

3. The apparatus according to claim 1 wherein the blade carrier has a second face opposite the first face, the second face having a pair of diametrically opposed slots, each aligned with a separate one of the slots in the first face and each sized to receive a blade therein.

4. The apparatus according to claim 1 wherein the means for gripping the wire comprises:

a traveler slidably mounted to the first rail and coupled to the lever means for reciprocation along the rail when the lever means is pivoted; and a pair of cammed jaws, each pivotally mounted to the traveler for rotation towards the other to grip the cable when the traveler is displaced by the lever means in a direction away from the slitting means and the jaws pivoting away from each other when the traveler is displaced towards the slitting means.

5. The apparatus according to claim 1 further including a cut-off guide for establishing the length of the outer insulative jacket to be stripped from the cable.

6. The apparatus according to claim 5 wherein the cut-off guide comprises:

a second rail carried by the frame parallel to the first rail;

a second traveler slidably mounted on the second rail for movement thereon along a path generally parallel to that portion of the cable extending beyond the slitting means;

a finger rotatably mounted to the second traveler for rotation between a first position at which the finger lies in the path of a cable and a second position at which the finger lies outside of the path of the cable; and means for displacing the second traveler along the second rail.

7. The apparatus according to claim 6 wherein the means for displacing the second traveler comprises:

a shaft rotatably journalled to the frame so as to rotate about an axis parallel to the second rail, the shaft having a threaded portion in threaded engagement with the traveler; and a crank for rotating the shaft to thread the threaded portion thereof through the second traveler to displace the second traveler along the second rail.

8. The apparatus according to claim 7 further including a scale carried by the frame for indicating each of a plurality of different distances, as measured along the frame, from the slitting means; and an indicator carried by the second traveler for cooperating with the scale to indicate the distance of the second traveler from the slitting means.

* * * * *